Jan. 1, 1929.
C. F. JENKINS
1,697,527
RADIO MOVIE RECEIVER
Filed June 25, 1927
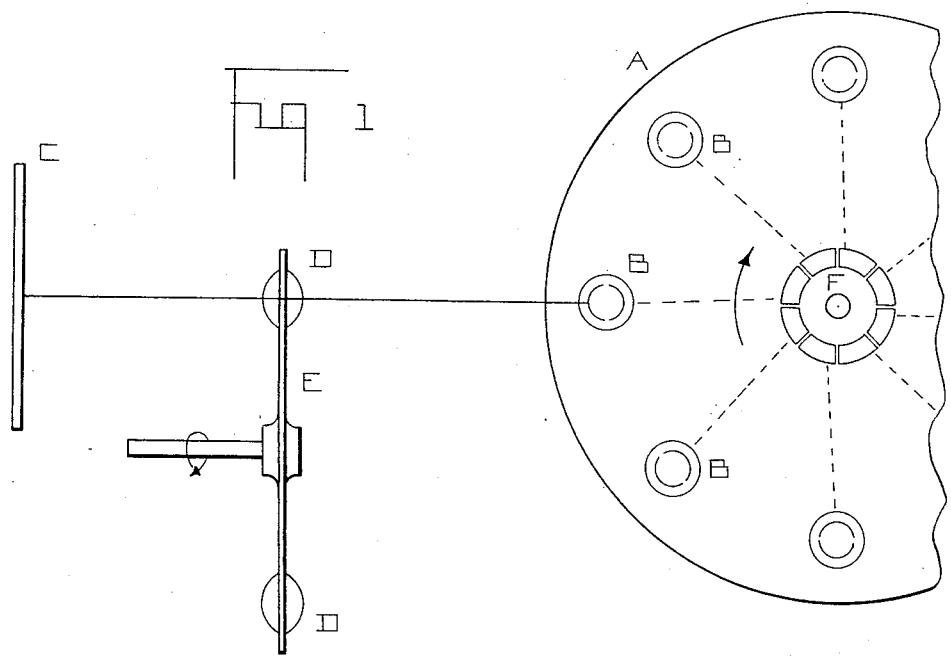
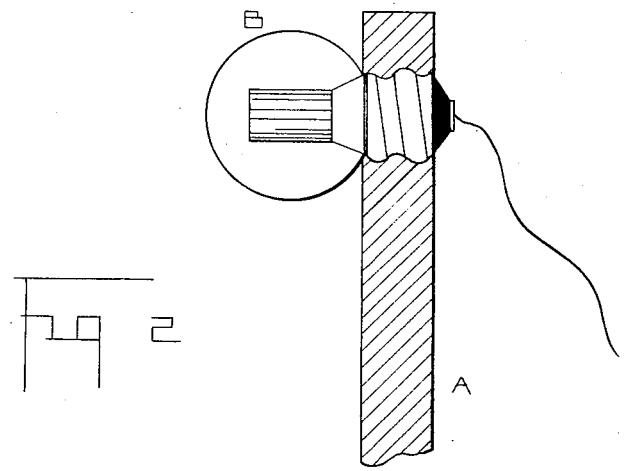

Patented Jan. 1, 1929.

1,697,527

UNITED STATES PATENT OFFICE.

CHARLES FRANCIS JENKINS, OF WASHINGTON, DISTRICT OF COLUMBIA.

RADIO MOVIE RECEIVER.

Application filed June 25, 1927. Serial No. 201,399.

This invention relates to radio movie receiving devices, and has for its principal object means for translating into a moving picture the electrical impulses received by radio or by wire from the motion picture film transmitter shown in my pending application.

Another object is to reduce practically to silence the noise commonly produced by high-running mechanisms.

Another object is to attain the above results with good illumination of the picture screen.

With these and other objects in view the invention consists in the novel details of construction and combination of parts hereinafter disclosed, and particularly pointed out in the claims.

In the accompanying drawings, Figure 1 is a schematic illustration of the parts involved, and Figure 2 a detail.

In the figures, A is a disc carrying a plurality of lamps B, B, B. This disc revolves in the plane of the drawing. C is a screen upon which light from these lamps is focused in succession by the lenses D, D, on disc E. There are but two such lenses shown, but any suitable number of lenses may be employed. Disc C revolves in a plane perpendicular to the plane of the drawing, that is, the lens-disc and the lamp-disc revolve in planes at right angles to each other.

As will be seen in Figure 2, the lamps are mounted with their main axis perpendicular to the face of the supporting disc. Current is carried to each lamp through an electrical conductor from the respective segment of the commutator F.

It may be mentioned that the high-frequency, high voltage lamps preferably used herein, will operate on a single wire connection.

In the operation of the mechanism the light source moves vertically, upward, for example, while the image of the light source downward on the screen, and at the same time is swept across the screen from left to right (perhaps) by the rotary movement of the lenses on the disc.

This vertical and lateral movement of the image-spot across the screen, when done at persistence-of-vision speed, makes the screen appear to be one smoothly lighted area; until the light is modulated.

The method of modulating the light spot as it moves over the screen to make up a picture is so well known to those skilled in the art that it is probably not necessary to be described here.

Either the lens disc or the lamp disc may rotate the faster, and produce the same results, and any usual method may be employed to rotate them.

What I claim, is:—

1. An apparatus for translating electrical impulses into a moving picture including a picture receiving surface, a carrier rotating in a plane approximately perpendicular to the plane of the picture receiving surface and provided with a plurality of light sources, a collector for the electrical impulses connected with the rotating light sources, and a lens carrier having a plurality of lenses movable in a plane approximately perpendicular to the rotating carrier and cooperating with the rotating carrier to scan the picture receiving surface.

2. An apparatus for translating electrical impulses into a moving picture including a picture receiving surface, a carrier rotating in a plane approximately perpendicular to the plane of the picture receiving surface and provided with an annular series of light sources, a collector for the electrical impulses connected with the rotating light sources, and a lens carrier having a plurality of lenses movable in a plane approximately perpendicular to the rotating carrier and cooperating with the rotating carrier to scan the picture receiving surface.

3. An apparatus for translating electrical impulses into a moving picture including a picture receiving surface, a carrier rotating in a plane approximately perpendicular to the plane of the picture receiving surface and provided with an annular series of light sources, a collector for the electrical impulses connected with the rotating light sources, and a lens carrier rotating in a plane approximately perpendicular to the said rotating carrier and provided with a plurality of lenses through which the light passes, said rotating carrier cooperating to scan the picture surface.

4. An apparatus for translating electrical impulses into a moving picture including a picture receiving surface, a carrier rotating in a plane approximately perpendicular to the plane of the picture receiving surface and provided with an annular series of high frequency lamps, a collector for the electrical impulses connected with the said lamps, and a lens carrier having a plurality of lenses and rotating in a plane approximately perpendicular to the plane of the lamp carrier and cooperating with the same to scan the picture receiving surface.

In testimony whereof I have affixed my signature.

CHARLES FRANCIS JENKINS.